A= RADIATION SOURCE   B= RADIATION MEASURING MEANS 3,365,667
SHIELDED CHAMBER FOR MEASURING ELECTROMAGNETIC OR ACOUSTIC WAVES
Josef Deutsch, Munich-Grosshadern, and Günter Vollhardt, Unterhaching, near Munich, Germany, assignors to Siemens Aktiengesellschaft, a corporation of Germany
Filed Mar. 22, 1963, Ser. No. 267,249
Claims priority, application Germany, Mar. 29, 1962, S 78,796
6 Claims. (Cl. 325—67)

The invention disclosed herein is concerned with a shielded, box shaped enclosure forming a chamber for measuring electromagnetic or acoustic waves.

Chambers of this kind are required, for example, in connection with the measurement of interference radiations or in connection with investigations concerning the directional characteristics of antennas or sound transducers. Such measurements are carried out in shielded chambers in order to keep away from the wave-receiving measuring instrument exterior influences, foreign radiation and the like. In case electromagnetic waves are involved, for example, up to frequencies in the giga cycle range, the shielding of the chamber will consist of electrically well conducting material, for example, copper, aluminum and the like.

In order to carry out the measurements matched to the "free" space, it is also known to line the walls of the measuring chamber with wave absorbing material. In the case of a measuring chamber for sound waves, the walls are in known manner lined with sound absorbing material. In the case of measuring electromagnetic waves or conducting investigations concerning antennas, the walls of the chamber are provided with material adapted to attenuate electromagnetic waves. Such arrangements, hereinafter referred to as absorbers, comprise, for example, cone-shaped members disposed on the walls, with the apices thereof directed inwardly of the chamber. These cones have wave-attenuating properties, being made of a material, for example, graphite embedded in synthetic material, wherein the electrical resistance decreases from the cone apex to the cone base which is adjacent to the wall. It is also known to assemble the absorbers in the manner of wave guides, of mutually perpendicularly disposed hard paper plates and the like which are provided with electrically conductive coatings. Arrangements of this kind are described, for example, in the German Patent 1,021,439, and also in the Swedish Patent 180,996 and the French Patent 1,287,228.

It is in practical operation impossible to make the walls which are provided with absorbers, entirely free of reflection. This would be possible only by the provision of an absorber with the wave resistance $Z_0=377$ ohm spaced by $\lambda/4$ from the reflection wall. Such absorbers act free of reflection only for given frequencies, since it is impossible to hold adjacent frequencies reflection free by the variation of the wave resistance therefor. Accordingly, upon carrying out measurements and investigations at different frequencies, for example, involving a given frequency spectrum, the absorber walls are advantageously designed so that the reflection factor assumes for the entire frequency range as low a value as possible. The absorbers are therefore laid out for wide band operation and generally reflect only about 10 percent of the impacting field strength. It may be mentioned here that the angle of incidence of the impacting waves plays a considerable part so far as the magnitude of the reflection factor is concerned.

The general endeavor was, to provide possibly all walls and in given conditions the ceiling of the measuring chamber with materials adapted to absorb electromagnetic waves or with materials adapted to absorb or to deaden sound. A complete lining of walls is not always possible or can be effected only with the aid of costly special constructions, at places where breaks are required, for example, for cable or pipe lead-throughs, windows, doors, covers and the like. A measuring chamber constructed to represent the "free" space, therefore does not meet the desired requirements in many cases despite nearly complete lining with absorbers or sound attenuating materials. A relatively great part of interference radiations is included in the measurements effected. Absorbers are relatively expensive and the placement thereof on walls is in some circumstances quite complicated and cumbersome. Moreover, a great deal of space which otherwise could be operationally utilized, is lost in cases requiring absorbers of considerable structural depth depending upon the frequency range which has to be absorbed. The structural depth of absorbers may amount to 1 meter.

The object underlying the invention is to greatly reduce the need for absorbers or, in the case of sound measurements, the need for sound deadening materials, substantially without worsening the representation of the "free" space, that is, substantially without worsening the interference radiation freedom at the place of measurement.

It was found that it is in connection with lining the walls merely important that substantially only those wall parts are provided with a wave absorbing lining, at which the radiation extending from the radiation source to the radiation measuring place, are not reflected more than twice. In the case of plural reflections at different wall parts, the respective radiations are attenuated to such an extent that only a very slight interference radiation part arrives at the radiation measuring place.

It is therefore according to the invention proposed to provide absorbers and sound deadening materials only at those wall parts at which are reflected only singly and dually reflected waves. Since the angle of incidence of the radiation must also be considered, and since the absorber lining is generally not constructed planar, this range of the radiation which is reflected only twice, is relatively wide.

It is therefore proposed, in accordance with another feature of the invention, to line two oppositely extending end walls of a generally box-shaped measuring chamber with approximately rectangular foundation, in known manner, practically completely with absorbers. The side walls, extending from the end walls, are for portions thereof amounting to $$\frac{b-r_1}{2}$$

not lined with absorbers, while the remaining parts of said side walls are throughout nearly the entire height thereof completely lined with absorbers. The radiation source and the radiation measuring place are arranged approximately symmetrically with respect to the center of the chamber and spaced apart by the amount $r_1$. The end walls, that is, the narrow sides of the box-shaped chamber, have a length $a$, and the side walls, that is, the wide sides of the chamber, have a length $b$. The doors, windows and similar openings may be arranged at the wall parts which are not lined with absorbers, without incurring any particular increase of the interference radiation influences. The form of the chamber is not limited to a rectangular foundation.

According to a further feature of the invention, the absorber lining is also considerably reduced, to about 25 percent, along the ceiling of the chamber. Only the centrally extending parts of the ceiling are lined with absorbers.

Further details of the invention will appear from the description thereof which is rendered below with reference to the accompanying drawings.

Figure 1:
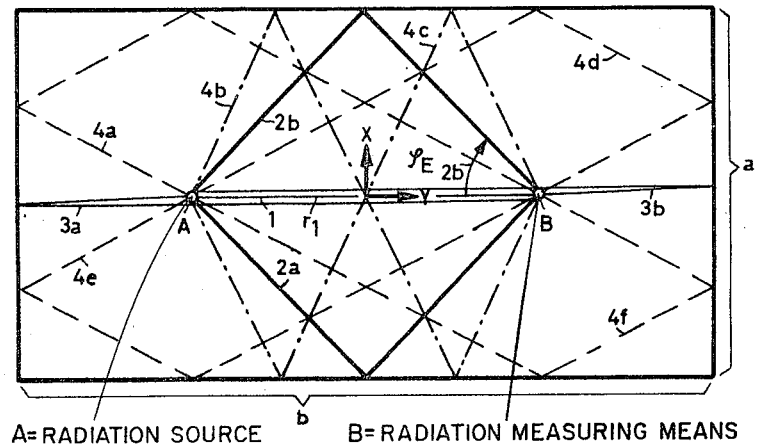
FIG. 1 shows in schematic manner the rectangular base area of a known interference radiation measuring chamber.

In FIG. 1, the marginal lines represent the walls which are lined with absorbers. The measuring chamber has side walls with a length $b$ and end walls with the width $a$. The radiation source A and the radiation measuring means B are arranged symmetrically with respect to the center of the measuring chamber and are spaced apart by the amount $r_1$. The invention is, however, not limited to such symmetrical arrangement; the radiation source A and the radiation measuring means B may also be arranged displaced from the center. The direct radiation beam or ray extends from the radiation source A, for example, a sender antenna, in the coordinate direction Y, to the radiation measuring means B, for example, a receiver antenna. The radiation measuring means B also receives respectively by way of the side walls and the end walls, singly reflected waves $2a$, $2b$ and $3a$, $3b$. The measurement at B is also influenced by plurally, for example, by twice reflected waves $4a$ to $4f$. The angle of incidence of the radiation impacting at B, with respect to the direct radiation 1 is indicated by $\varphi_E$, for example, in connection with the radiation $2b$, by $\varphi_{E_{2b}}$.

It was found that those waves which are at the absorber walls reflected only once, influence the measurement most strongly in a disturbing sense. Since the reflection factor of these absorber walls has approximately the value of 10 percent, the plurally reflected waves, for example, twice reflected waves, arriving at the measuring means, are weakened to such an extent that they influence the measuring result only negligibly. It is therefore proposed, in accordance with the invention, to omit the lining with absorbers in connection with the wall parts at which waves are reflected more than twice. However, it was also found that the height of the absorber walls must not be reduced since critical reflections occur at the upper and lower edges thereof.

Figure 2:
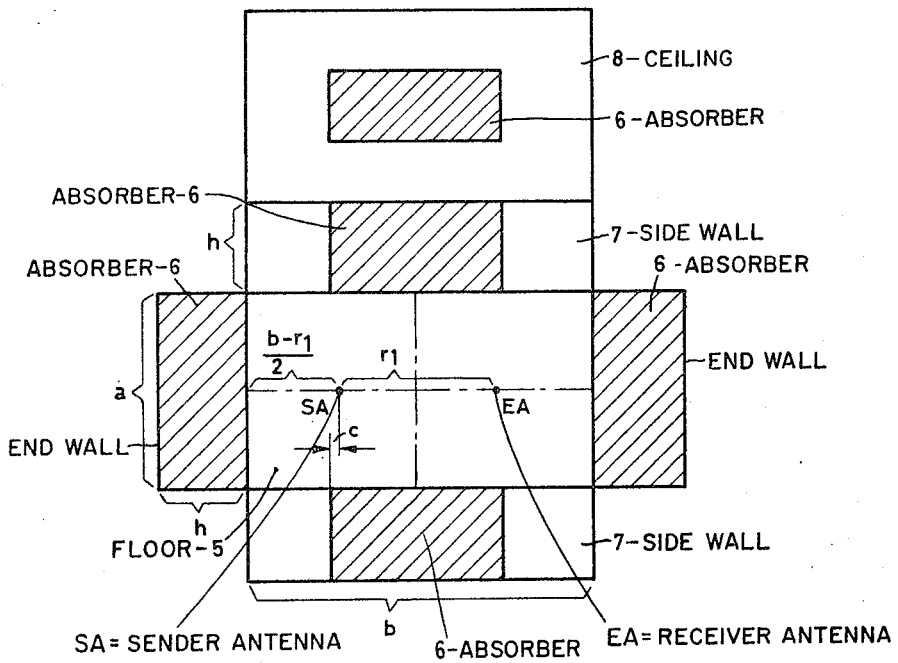
FIG. 2 is a developed view of the measuring chamber and shows the distribution of absorbers.

FIG. 2 shows a developed view of the measuring chamber and the distribution of the absorbers therein. The floor 5 of the measuring chamber on which are positioned the sender antenna SA and the receiver antenna EA, spaced apart by the amount $r_1$, is according to customary practice not lined with absorbers. The side walls 7 with a length $b$ are lined with absorbers 6 only along the central part but throughout the entire height $h$ thereof. The outer parts of these side walls are, for portions $$\frac{b-r_1}{2}$$

extending from the end walls, are not lined with absorbers, and the ceiling 8 is likewise lined only throughout the central area thereof. It is advisable to hold the side walls free of absorbers somewhat less than the portion $$\frac{b-r_1}{2}$$

for example, by the amount $c$. As mentioned before, the end walls are lined with absorbers 6 substantially throughout the entire extent thereof; however, absorber lining may be omitted for about 5 percent of the length on each side of the respective end wall, without detrimental effect on the evaluation factor of the chamber. It is, nevertheless, inadvisable to fully utilize this tolerance, but to omit about 5 percent of the length of the respective end wall in the event that the full length cannot be obtained due to the size of the absorber components, thus avoiding the necessity of producing absorber components of special size.

Figure 3:
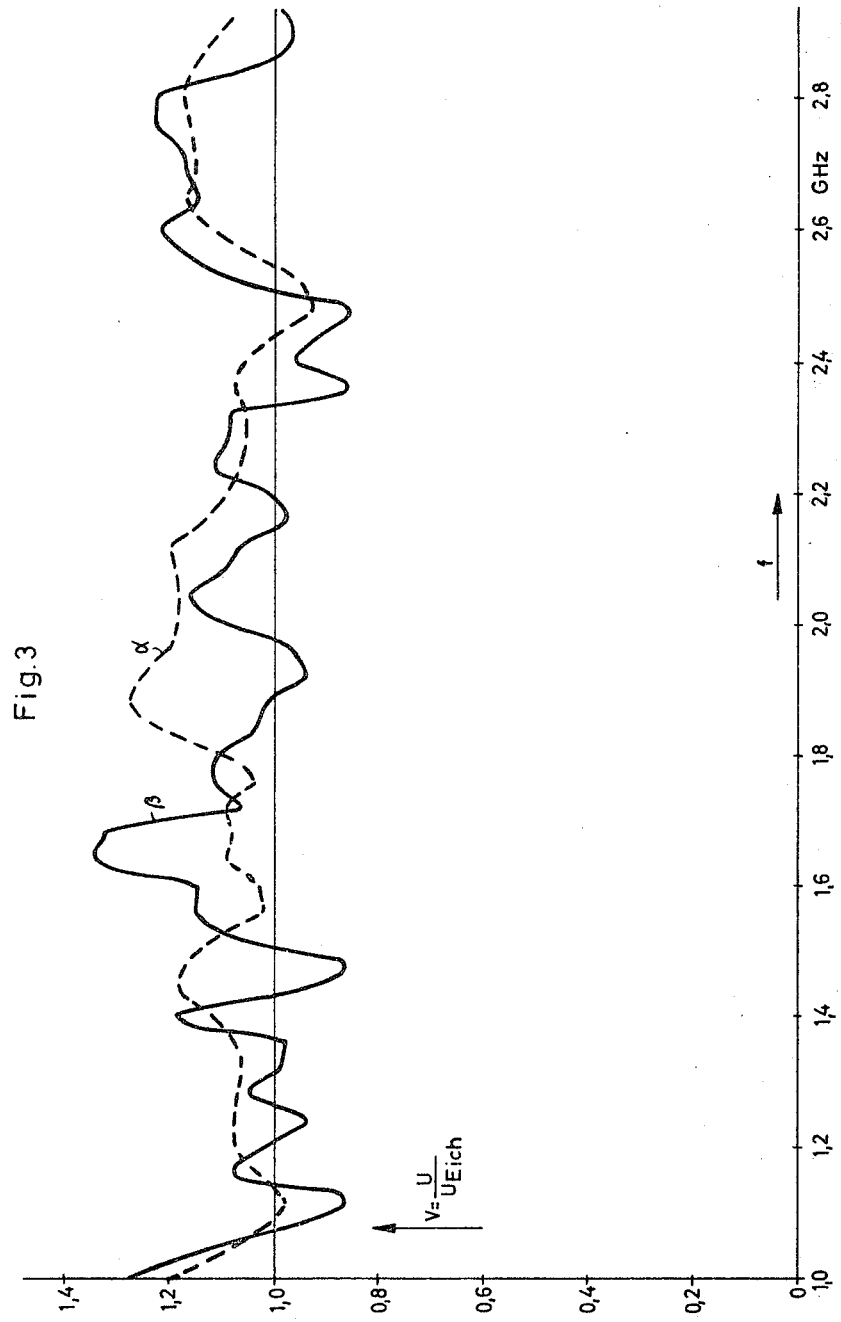
FIG. 3 represents measuring curves.

FIG. 3 shows measurement curves of the ratio $$V = U/U_{\text{Eich}}$$

of the voltage U at the place of reception in an absorber chamber $\alpha$ which is partially lined according to the invention, compared with the voltage $U_{\text{Eich}}$ of the "free" space, and in a completely lined absorber space $\beta$. It will be seen that the measurement results are only negligibly worsened despite the saving of about 50 percent of absorber lining as compared with a fully lined chamber.

Figure 4:
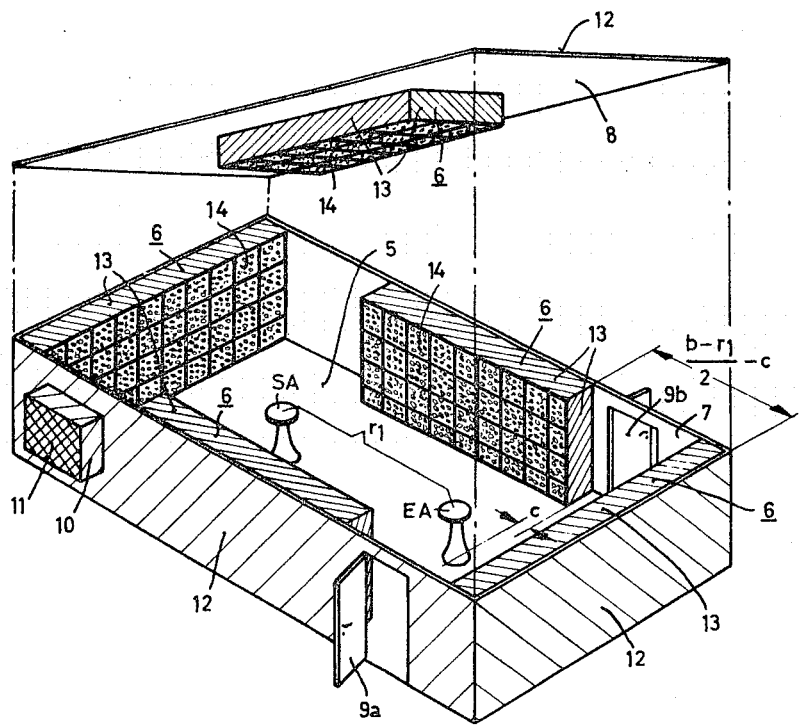
FIG. 4 shows an example of a measuring chamber which is shielded in accordance with the invention.

The measuring chamber shown in FIG. 4 corresponds to the one shown in developed view in FIG. 2. The side walls 7 are incompletely lined with absorber 6 while the end walls are lined completely.

All walls, the ceiling 8 and the floor 5 are shielded with material 12 of good conductivity, for example, aluminum sheet with tight seams, so as to prevent entry of exterior electromagnetic interference fields into the measuring chamber. The doors $9a$ and $9b$ are likewise shielded with material which is a good electrical conductor. Means for shielding against electromagnetic waves are provided at the seams between the doors and the wall parts 7. Means adapted for this purpose are described, for example, in the Danish Patents 93,577 and 93,744 as well as in the Swiss Patent 353,775. Other appropriate and known shielding means may be used.

According to the invention, absorbers 6 are arranged along the sides of the measuring chamber only at parts thereof which lie substantially directly opposite to the sender antenna SA and the receiver antenna EA, thus leaving unlined wall parts for the provision of doors $9a$, $9b$ and a window 10, substantially without reducing the reflection freedom of the measuring chamber. The window 10, which does not pass any electromagnetic waves of the frequency range which is important for the measurement, for example, frequencies up to the giga cycle range, is made, for example, of material which is a good electrical conductor and arranged in honeycomb-like fashion. These "honeycomb-chimneys" which are, for example, several decimeters long, depending upon the waves which are to be attenuated and kept away from the measuring chamber, pass the very short wave light rays while shielding against the electromagnetic waves which are of lower frequency.

Along the narrow end walls of the measuring chamber are provided absorbers 6 throughout the widths thereof. The absorbers are made, for example, of plates 13 of material which attenuates electromagnetic waves, arranged in interlaced honeycomb-like fashion, for example, hard paper provided with graphite paint, and the cavities formed thereby may be filled with foam material. The structural depth of the absorber walls 6 may be reduced, as described, for example, in the French Patent 1,287,228, by using a foam material with a dielectric constant greater than $E_0$ and in a given case a permeability greater than $\mu_0$. The attenuation layers 13 may be constructed, for example, as described in the Swedish Patent 180,996.

In FIG. 4, the ceiling 8 has been shown separated from the walls to bring out details more clearly. The ceiling is likewise provided with material 12 which is a good electrical conductor or consists of such material, for example, aluminum sheet. Absorbers 6 are provided on the ceiling 8 along the area thereof which extends above the sender antenna SA and the receiver antenna EA. These absorbers which are likewise formed of layers 13, adapted to attenuate electromagnetic waves, are made, for example, of graphite with filler substance 14 and arranged in honeycomb-like fashion.

It is in given situations advantageous, for a further improvement of the reflection freedom, to place the sender and receiver antennas, in accordance with another feature of the invention, not exactly centrally of the measuring chamber, but somewhat displaced from the center. The waves which are reflected only once shall thereby be substantially cancelled by interference radiation. The length of the radiation beam 2a is increased with respect to the length of the radiation beam 2b, thereby effecting a phase shift of one radiation beam with respect to the other.

The construction of the measuring chamber, shielded according to the invention, makes it possible to reduce by about 50 percent the lining of the walls with absorbers, substantially without worsening the reflection freedom, thereby effecting great savings with respect to expensive absorber walls. It is moreover possible, to provide in simple manner and substantially without detrimentally affecting the freedom of reflection, doors, windows and other necessary entrance- and exit openings, without requiring lining the corresponding areas with absorber materials which may in given situations call for a depth of several decimeters. Doors provided in the past with such absorber linings make it generally impossible to journal them with the aid of hinges, requiring instead slidable disposal thereof.

Changes may be made within the scope and spirit of the appended claims which define what is believed to be new and desired to have protected by Letters Patent.

We claim:

1. A generally box-shaped enclosure forming a chamber for measuring electromagnetic, acoustic, and like waves, with the aid of a radiation source and radiation measuring means disposed in spaced relation, said chamber having major areas of the inner walls thereof visible from both the source and the measuring means, said areas comprising lined and unlined portions, and wave absorbing material forming the lining of said lined portions, said lined portions including all areas at which radiations reflected therefrom can travel from the source to the measuring means with less than three intermediate reflections, and said unlined portions including only areas at which radiations reflected therefrom travel from the source to the measuring means with at least three intermediate reflections.

2. A generally box-shaped enclosure according to claim 1, wherein two oppositely extending end walls are substantially completely lined with absorbers, the side walls being substantially completely lined with absorbers over the entire height thereof except for areas of said side walls extending from the respective end walls for a distance of about $$\frac{b-r_1}{2}$$

wherein $b$ is the length of the measuring chamber and $r_1$ the spacing of the radiation source from the radiation measuring means, said source and said measuring means being positioned substantially centrally of the chamber.

3. A measuring chamber according to claim 2, comprising absorber means provided centrally of the ceiling of the chamber and covering only about 25 percent of the total ceiling area.

4. A measuring chamber according to claim 3, wherein the floor thereof is free of absorber means.

5. A measuring chamber according to claim 4, wherein elements, such as doors, windows, pipe lead-throughs, etc., are disposed at wall areas which are free of absorber means.

6. A measuring chamber according to claim 5, wherein the walls extend at right angles to one another.

References Cited

UNITED STATES PATENTS

| | | | |
|---|---|---|---|
| 2,599,944 | 6/1952 | Salisbury | 325—67 |
| 3,100,870 | 8/1963 | Smith | 325—67 |
| 3,113,271 | 12/1963 | Buckley | 325—67 |
| 3,120,641 | 2/1964 | Buckley | 325—67 |

JOHN W. CALDWELL, *Primary Examiner.*

DAVID G. REDINBAUGH, ROBERT L. GRIFFIN,
*Examiners.*